(12) United States Patent
Tillis

(10) Patent No.: US 7,713,571 B2
(45) Date of Patent: May 11, 2010

(54) EGG NUGGETS

(75) Inventor: Marc Tillis, Roseville, MN (US)

(73) Assignee: Michael Foods, Inc., Minnetonka, MN (US)

( * ) Notice: Subject to any disclaimer, the term of this patent is extended or adjusted under 35 U.S.C. 154(b) by 900 days.

(21) Appl. No.: 10/800,577

(22) Filed: Mar. 15, 2004

(65) Prior Publication Data

US 2005/0202150 A1 Sep. 15, 2005

(51) Int. Cl.
A23L 1/32 (2006.01)

(52) U.S. Cl. ............................... 426/614; 426/558

(58) Field of Classification Search ............ 426/614, 426/558

See application file for complete search history.

(56) References Cited

U.S. PATENT DOCUMENTS

| | | |
|---|---|---|
| 3,645,747 A | 2/1972 | Palmer |
| 3,650,766 A | 3/1972 | Smadar |
| 3,732,114 A | 5/1973 | Field et al. |
| 3,772,035 A | 11/1973 | Carp et al. |
| 3,873,736 A | 3/1975 | Palmer et al. |
| 3,897,572 A | 7/1975 | Riggs et al. |
| 3,898,345 A | 8/1975 | Horrocks et al. |
| 3,922,352 A | 11/1975 | Tewey et al. |
| 3,930,054 A | 12/1975 | Liot et al. |
| 3,941,892 A | 3/1976 | Glasser et al. |
| 3,950,550 A | 4/1976 | Katayama et al. |
| 3,953,611 A | 4/1976 | Youngquist |
| 3,966,977 A | 6/1976 | Levinson et al. |
| 3,970,761 A | 7/1976 | Wenger et al. |
| 4,000,323 A | 12/1976 | Youngquist |
| 4,045,585 A | 8/1977 | Appleman et al. |
| 4,052,517 A | 10/1977 | Youngquist |
| 4,068,570 A | 1/1978 | Lanoie |
| 4,072,764 A | 2/1978 | Chess |
| 4,099,455 A | 7/1978 | Wenger et al. |
| 4,132,809 A | 1/1979 | Desrosier |
| 4,138,507 A * | 2/1979 | Iimura ..................... 426/614 |
| 4,154,863 A * | 5/1979 | Kahn et al. ................ 426/553 |
| 4,178,394 A | 12/1979 | Kumar |
| 4,197,324 A | 4/1980 | Ziminski et al. |
| 4,209,536 A | 6/1980 | Dogliotti |
| 4,301,181 A | 11/1981 | Simon et al. |
| 4,301,182 A | 11/1981 | Simon et al. |
| 4,310,560 A | 1/1982 | Doster et al. |
| 4,324,807 A | 4/1982 | Kim et al. |
| 4,332,823 A | 6/1982 | Buemi |
| 4,360,537 A | 11/1982 | Tan et al. |
| 4,361,588 A | 11/1982 | Herz |
| 4,382,973 A | 5/1983 | de Figueiredo et al. |
| 4,388,333 A | 6/1983 | Maurice et al. |
| 4,388,340 A | 6/1983 | de Figueiredo et al. |
| 4,421,770 A | 12/1983 | Wiker et al. |
| 4,427,704 A | 1/1984 | Cheney et al. |
| 4,455,318 A | 6/1984 | Maurice et al. |
| 4,469,708 A * | 9/1984 | Rapp et al. ................. 426/103 |
| 4,495,205 A | 1/1985 | Brander et al. |
| 4,503,080 A * | 3/1985 | Brabbs et al. ............... 426/94 |
| 4,537,783 A | 8/1985 | Liepa |
| 4,675,197 A | 6/1987 | Banner et al. |
| 4,693,899 A | 9/1987 | Hong et al. |
| 4,728,524 A | 3/1988 | Gagliardi, Jr. |
| 4,738,855 A | 4/1988 | Kuroda et al. |
| 4,759,933 A | 7/1988 | Uchida et al. |
| 4,778,684 A | 10/1988 | D'Amico et al. |
| 4,880,654 A | 11/1989 | Okada et al. |
| 4,882,194 A | 11/1989 | Rapp |
| 4,889,730 A | 12/1989 | Roberts et al. |
| 4,913,917 A | 4/1990 | Polancic |
| 4,948,603 A | 8/1990 | Bernacchi et al. |
| 5,008,121 A | 4/1991 | Bernacchi et al. |
| 5,039,538 A | 8/1991 | Tamaki et al. |
| 5,059,445 A | 10/1991 | Arsem |
| 5,063,073 A | 11/1991 | Kratochvil |
| 5,073,399 A | 12/1991 | Vassiliou |
| 5,082,674 A | 1/1992 | Carrell |
| 5,091,201 A | 2/1992 | Murata et al. |
| 5,102,683 A | 4/1992 | Letton et al. |
| H1053 H | 5/1992 | Coffey et al. |
| 5,151,293 A | 9/1992 | Vassiliou |
| 5,204,131 A * | 4/1993 | Frattinger et al. ........... 426/243 |
| 5,227,189 A | 7/1993 | Vassilliou |
| 5,340,601 A | 8/1994 | Vassiliou |
| 5,360,625 A | 11/1994 | Sikking et al. |
| 5,427,016 A | 6/1995 | Dunckel |
| 5,472,725 A | 12/1995 | Mendenhall |
| 5,505,977 A | 4/1996 | Neumeister |
| 5,665,419 A | 9/1997 | Teraguchi et al. |
| 5,736,181 A * | 4/1998 | Bezner et al. ............... 426/285 |

(Continued)

FOREIGN PATENT DOCUMENTS

EP 0 536 982 A3 4/1993

(Continued)

OTHER PUBLICATIONS

AllRecipes Website. "Sweet and Sour Pork Patties". Published before May 25, 2003. Http://www.allrecipes.com.*

*Primary Examiner*—Anthony Weier
(74) *Attorney, Agent, or Firm*—Fredrikson & Byron, P.A.

(57) ABSTRACT

An egg-based material that includes an egg-based substance, a water-absorbent thickener distributed throughout the egg-based material, and pieces of supplemental food distributed throughout the egg-based material, where the egg-based substance includes a natural liquid egg component and the water-absorbent thickener is effective to maintain distribution of the pieces of supplemental food throughout the egg-based material.

50 Claims, No Drawings

U.S. PATENT DOCUMENTS

| | | |
|---|---|---|
| 5,792,504 A | 8/1998 | Poppel |
| 5,932,276 A | 8/1999 | Bhatia et al. |
| 6,235,330 B1 | 5/2001 | Scherpf et al. |
| 6,238,720 B1 | 5/2001 | Popper et al. |
| 6,322,841 B1 | 11/2001 | Jackson et al. |
| 6,391,371 B1 | 5/2002 | Bhatia et al. |
| 6,468,579 B1 | 10/2002 | Roussel et al. |
| 6,475,550 B2 | 11/2002 | Knipper et al. |
| 6,500,477 B2 | 12/2002 | Wofford |
| 6,814,999 B2 * | 11/2004 | Knipper et al. ............. 426/614 |
| 7,264,840 B2 * | 9/2007 | Hudson et al. ............. 426/614 |
| 2002/0012722 A1 | 1/2002 | Prosise et al. |
| 2002/0022079 A1 | 2/2002 | Paluch |
| 2002/0039612 A1 | 4/2002 | Gambino et al. |
| 2002/0068115 A1 | 6/2002 | Hayes-Jacobson |
| 2002/0106438 A1 | 8/2002 | Trout et al. |
| 2002/0136778 A1 | 9/2002 | Claycamp et al. |
| 2002/0142070 A1 | 10/2002 | Bedi et al. |
| 2003/0017242 A1 | 1/2003 | Jacobson et al. |
| 2003/0044510 A1 * | 3/2003 | Pfeiffer ..................... 426/646 |
| 2003/0077375 A1 | 4/2003 | Olavarria |
| 2003/0113434 A1 | 6/2003 | Marsland |
| 2004/0067283 A1 | 4/2004 | Hudson et al. |
| 2005/0186321 A1 * | 8/2005 | Ullrich et al. ............... 426/614 |

FOREIGN PATENT DOCUMENTS

| | | | |
|---|---|---|---|
| FR | 2639517 | * | 6/1990 |
| JP | 58000874 A2 | | 1/1983 |
| JP | 62-6627 | * | 1/1987 |
| JP | 63157941 A2 | | 6/1988 |
| JP | 63-216455 | * | 9/1988 |
| JP | 1-228440 | * | 9/1989 |
| JP | 1-317365 | * | 12/1989 |
| JP | 2-69166 | * | 3/1990 |
| JP | 03147752 A2 | | 6/1991 |
| JP | 10-146176 | * | 6/1998 |
| JP | 2001-45959 | * | 2/2001 |
| JP | 2003-219842 | * | 8/2003 |
| WO | WO 01/64042 A1 | | 9/2001 |

* cited by examiner

EGG NUGGETS

CROSS-REFERENCE TO RELATED APPLICATION(S)

The co-pending patent application filed on even date, Published U.S. Application No. 2005/0202151, entitled "Method of Preparing Egg Nuggets", is incorporated herein by reference in its entirety.

BACKGROUND OF THE INVENTION

The present invention generally relates to an egg-based material. Additionally, the present invention relates to a cooked egg-based food product that exhibits freeze/thaw stability upon being frozen and reheated.

Eggs, especially eggs produced by chickens, are a main food staple in the diets of many people. Eggs are often used as a main course for breakfast and may be prepared in a variety of ways. For example, eggs may be scrambled, fried, boiled, and poached. Cooked eggs are nutritious and contain significant amounts of beneficial protein.

One challenge is cooked eggs traditionally cannot be held or stored for extended periods of time after being cooked while maintaining the desirable organoleptic properties of freshly cooked eggs. When eggs are heated during cooking, the proteins within the eggs form a coagulated mass of protein. Besides containing coagulable proteins, eggs typically contain between about 75 weight percent and about 80 weight percent water, based on the total weight of the eggs. Much of this water contained in eggs prior to cooking is free water that is not chemically bound to any particular component of the eggs. When eggs are heated during cooking, at least some of this free water is trapped within the coagulated mass of protein.

When cooked eggs containing the coagulated mass of proteins are frozen, the free water trapped within the coagulated mass forms ice crystals. When the frozen eggs are thawed and the ice crystals trapped within the coagulated mass thaw along with the coagulated mass, much of the free water resulting from thawing of the ice crystals typically does not remain entrapped within the coagulated mass. Instead, free water resulting from thawing of the ice crystals formerly entrapped within the frozen coagulated mass has a tendency to separate and "sweep" away from the thawed coagulated mass.

Loss of the entrapped free water upon thawing of the frozen cooked eggs adversely affects the organoleptic properties of the thawed coagulated mass. Loss of entrapped free water from the thawed cooked egg tends to cause the thawed coagulated mass to become tough, chewy, and less palatable to human beings. The thawed coagulated mass may also be visually unappealing because of the visible escape of free water from the thawed coagulated mass.

One potential approach to solving the problem of free water escape from the thawed coagulated mass entails removing moisture from raw eggs prior to cooking the eggs. If all of the free water is removed from raw eggs, only egg solids, possibly with some bound amount of water, remains. Egg solids, also known as powdered eggs, that remain following free water removal from raw eggs have a long shelf life and may be reconstituted by combining the egg solids with water. However, the reconstituted eggs, upon heating to cook and form the coagulated mass, do not have the same organoleptic properties, such as taste, texture, or visual appearance, of freshly cooked eggs formed by cooking raw eggs that have not been subjected to moisture removal. Consequently, a need continues to exist for a better solution to the problem of free water escape from the thawed form of frozen, previously-cooked eggs and similarly from the thawed form of frozen, previously-cooked egg-based products.

BRIEF SUMMARY OF THE INVENTION

The present invention includes various egg-based materials. One embodiment of the egg-based material includes an egg-based substance, a water-absorbent thickener distributed throughout the egg-based material, and pieces of supplemental food distributed throughout the egg-based material. The egg-based substance includes a natural liquid egg component, and the water-absorbent thickener is effective to maintain distribution of the pieces of supplemental food throughout the egg-based material. The present invention also includes a cooked food product where the cooked food product includes a form of any of the egg-based materials wherein the natural liquid egg component is coagulated.

DETAILED DESCRIPTION

The present invention generally relates to an egg-based material. Additionally, the present invention relates to a cooked egg-based product that exhibits freeze/thaw stability upon being frozen and reheated.

An egg-based substance that includes at least one natural liquid egg component is prepared. The egg-based substance is combined with at least one thickening agent to form the egg-based material. The thickening agent(s) absorb water, such as free water present in the natural liquid egg component(s). Pieces of supplemental food, such as diced cheese, meat, fish, shellfish, vegetables, fruit, and grains may optionally be incorporated in the egg-based material. The egg-based material is heated to cook the egg-based material and form the cooked egg-based product. The cooked egg-based product exhibits freeze/thaw stability. The cooked egg-based product may optionally be battered and/or breaded and fried to form a fried egg-based product. The fried egg-based product also exhibits freeze/thaw stability.

As used herein, the term "egg" means the round or oval female reproductive body of an animal, such as a bird, usually consisting of an embryo (egg yolk) surrounded by nutrient material (egg white) and a protective covering (egg shell). Though reptiles, amphibians, and other animals also produce eggs, the eggs of birds are of principal interest for use in the present invention. Nonetheless, eggs produced by reptiles, amphibians, and other animals do fall within the scope of the term "egg," as used herein. Eggs produced by chickens, ducks, geese, and ostriches are some non-exhaustive examples of bird eggs that may be employed when practicing the present invention. Desirably, eggs produced by chickens are employed when practicing the present invention.

As used herein, the term "natural liquid egg component" means a naturally-occurring liquid egg component, such as liquid egg white, liquid egg yolk, liquid whole egg, and any combination of any of these in any proportion, where the liquid egg component has not been subjected to any processing to remove naturally-occurring water from the naturally-occurring liquid egg component and has not been subjected to any processing that causes more than a de minimis change in the natural liquid nature of the naturally-occurring liquid egg component. As used herein, the term "liquid whole egg" means the naturally occurring combination of liquid egg white and liquid egg yolk typically present in an egg.

The egg-based substance includes at least one natural liquid egg component, such as liquid egg white, liquid egg yolk, liquid whole egg, and any combination of any of these in any proportion. Besides the natural liquid egg component(s), the egg-based substance may optionally include other egg component(s), such as powdered or concentrated egg solids, including powdered or concentrated egg whites, powdered or concentrated egg yolks, any combination of any of these in any proportion, and any aqueous solution of any of these. These optional egg components may be used in combination with any natural liquid egg component(s) in any proportion. Beneficially, however, the egg-based substance may contain only egg component(s) that are natural liquid egg component(s) to maximize the beneficial organoleptic properties contributed by the natural liquid egg component(s) to the cooked egg-based product and to derivatives of the cooked egg-based product, such as the fried egg-based product.

The collective concentration of the natural liquid egg component(s) in the egg-based substance may generally range from about 65 weight percent to about 99.5 weight percent, and in some embodiments may range from about 97 weight percent to about 99.5 weight percent, based on the total weight of the egg-based substance, when the liquid dairy material(s) mentioned below are excluded from the egg-based substance. However, the collective concentration of the natural liquid egg component(s) in the egg-based substance may generally range from about 45 weight percent to about 99.5 weight percent, and in some embodiments may range from about 75 weight percent to about 99.4 weight percent, based on the total weight of the egg-based substance, when the liquid dairy material(s) mentioned below are included in the egg-based substance.

Besides the egg component(s), optional ingredients, such as fat(s), stabilizing agent(s), liquid dairy material(s), flavoring agent(s), coloring agent(s), added water, and any combination of any of these in any proportion may optionally be incorporated in the egg-based substance. As an example, the optional ingredient(s) may be included in the egg-based substance for purposes of modifying the flavor, texture, appearance and/or cost of the cooked egg-based product and/or derivatives of the cooked egg-based product. As a further example, the optional ingredient(s) may be included in the egg-based substance for purposes of modifying in-process characteristics of the egg-based substance and/or the egg-based material.

As noted, fat(s) may optionally be included in the egg-based substance. Any fat(s) that are employed are typically included for purposes of modifying the texture and/or taste of the cooked egg-based product and/or derivatives of the cooked egg-based product. As used herein, the term "fat" refers to compositions that are primarily, or fully, made of one or more fatty acids, and glycerides thereof, of all types, no matter whether the composition is a liquid (i.e. "oil") at room temperature or is a solid (i.e.: "fat") at room temperature, or is a semi-solid (mixture of oil and fat) at room temperature.

The optionally included fat(s) may be or include either dairy fat(s), such as butterfat (also known as butter oil); non-dairy fat(s); or any combination of any dairy fat(s) and non-dairy fat(s) in any proportion. The non-dairy fat(s) may be any conventional, shelf stable, non-dairy fat(s), non-dairy oil(s), or any mixtures thereof from either plant (vegetable), animal, or marine sources. A non-exhaustive list of suitable plant fats includes corn oil, peanut oil, soybean oil, canola oil, olive oil, sunflower oil, safflower oil, cottonseed oil, coconut oil, palm oil, palm kernel oil, and any of these in any combination and in any proportion. The optional fat, if included in the egg-based substance, preferably is corn oil or soybean oil. If included in the egg-based substance, the collective concentration of the fat(s) in the egg-based substance may generally range from about 0.1 weight percent to about 10 weight percent, based on the total weight of the egg-based substance.

Non-exhaustive examples of suitable optional stabilizing agents include various starches, various gums, various starch-like plant extracts and materials, and any combination of these in any proportion. Exemplary starches include cereal starch, tuber starch, any other plant starch (such as sago starch, for example), or any combination of any of these in any proportion. Some non-exhaustive examples of suitable cereal starches include corn starch, wheat starch, rice starch, waxy maize starch, sorghum starch, waxy sorghum starch, seed starch and any combination of any of these in any proportion. Some non-exhaustive examples of suitable tuber starches including potato starch, arrowroot starch, tapioca starch, and any combination of these in any proportion. Some non-exhaustive examples of suitable gums include arabic gum, tragacanth gum, karaya gum, ghatti, guar gum, locust bean gum, xanthan gum, gellan gum, tamarine gum, agar-agar gum, furcellaran gum, gum acacia, and any combination of any of these in any proportion. Some non-exhaustive examples of suitable plant extracts include pectin, arabinogalacton, psyllium, quince seed, alginates, carrageenans, and any combination of these in any proportion. One non-exhaustive suitable example of other starch-like plant materials is cellulose. Alternatively, certain animal materials with starch-like characteristics, such as gelatin, albumin, casein, soy protein, any combination of any of these in any proportion, and any combination of any of these with any starch and/or gum in any proportion may also be used as the optional stabilizing agent.

The egg-based substance beneficially may include the optional stabilizing agent to modify (enhance) the viscosity of the egg-based substance and provide the cooked egg-based product and/or derivatives of the cooked egg-based product with a smoother, shorter texture. The optional stabilizing agent generally should have a relatively high degree of freeze-thaw stability that allows the optional stabilizing agent to impart freeze-thaw stability to products that incorporate the cooked egg-based product and/or derivatives of the cooked egg-based product. To achieve or enhance these viscosity, textural, and freeze/thaw stability properties, starch that is used as all or part of the optional stabilizing agent may optionally be physically-modified, chemically-modified, and/or enzymatically-modified, as desired. Furthermore, the starch that may form all or any portion of the optional stabilizing agent may generally be gelatinized (pre-gelled) starch, non-gelatinized (cookup or non-gelatinized) starch, or any combination of these in any proportion. Beneficially, the optional stabilizing agent will generally be in a form, such as a powdered form, that allows homogenous and uniform dispersion of the optional stabilizing agent throughout the egg-based substance.

In one embodiment, the egg-based substance includes xanthan gum, and may include a combination of xanthan gum and a modified, waxy maize cookup starch, as the stabilizing agent(s). If included in the egg-based substance, the concentration of xanthan gum in the egg-based substance may generally range from about 0.01 weight percent to about 0.5 weight percent, based on the total weight of the egg-based substance, with concentrations of xanthan gum in the egg-based substance ranging from about 0.125 weight percent to about 0.2 weight percent, based on the total weight of the egg-based substance, being employed in some embodiments. If included in the egg-based substance, the concentration of the modified, waxy maize cookup starch in the egg-based substance may generally range from about 0.1 weight percent to about 1 weight percent, based on the total weight of the egg-based substance though concentrations of the modified, waxy maize cookup starch in the egg-based substance ranging from about 0.2 weight percent to about 2 weight percent, based on the total weight of the egg-based substance, are employed in some embodiments. Some examples of suitable modified, waxy maize cookup starches include those available under the CONSISTA trade name designation from A E. Staley Manufacturing Company of Decatur, Ill. and those available under the PURITY trade name designation from the Food Division sales office in Lincolnshire, Ill. of National Starch and Chemical Company.

Those skilled in the art will recognize that concentrations for starch(es) and/or gum(s) other than xanthan gum and modified, waxy maize cookup starch that may be employed as the stabilizing agent(s) in the egg-based substance are highly dependent upon the properties and characteristics of the selected stabilizing agent(s). Those skilled in the art will be capable of selecting starch(es) and/or gum(s) (and concentrations thereof), in addition to the described combination of xanthan gum and modified, waxy maize cookup starch, that may be employed in the egg-based substance in place of the noted combination of xanthan gum and modified, waxy maize cookup starch.

Dairy material(s) may optionally be included in the egg-based substance to provide the cooked egg-based product and/or derivatives of the cooked egg-based product with a smoother, shorter texture, and/or altered taste profile. Some non-exhaustive examples of suitable dairy materials that may optionally be included in the egg-based substance include whole milk, reduced-fat milk, non-fat milk, dairy cream, buttermilk, sour cream, yogurt, and any of these in any combination in any proportion.

The optional dairy material(s) may be in liquid form or in powdered form. Liquid forms of the optional dairy material(s) may be reconstituted liquid forms prepared by combining aqueous fluid(s), such as water, with powdered forms of the dairy material(s). In some embodiments, any dairy material(s) included in the egg-based substance are in liquid form and are not of the reconstituted liquid form. Powdered dairy material(s) and reconstituted liquid form(s) of the dairy material(s) may not provide the cooked egg-based product and/or derivatives of the cooked egg-based product with the same textural attributes and taste profile characteristics contributed by liquid, but not reconstituted, forms of the dairy material. Liquid forms of dairy materials may generally be included in the egg-based substance at a collective concentration ranging from about 0.1 weight percent to about 50 weight percent, based on the total weight of the egg-based substance.

The egg-based substance may optionally include added water, though numerous embodiments are free, or essentially free, of any added water. If added water is included, the concentration of the added water in the egg-based substance may be up to 50 weight percent, based on the total weight of the egg-based substance. As used herein with regard to the egg-based substance, the term "added water" means water added separately from any other component(s) of the egg-based substance and water included as part of any reconstituted (i.e. made from a dry or dried form) component(s) of the egg-based substance.

When added water is included in the egg-based substance, it has been surprisingly found that a corresponding increase in the amount of thickening agent is not necessarily required for purposes of attaining a homogeneous blend of the components of the egg-based material or achieving freeze/thaw stability in the various egg-based products of the present invention. Rather, when added water is included in the egg-based substance, the percentage increase in the weight-based concentration of the thickening agent in the egg-based material (based on the total weight of the egg-based material) is often less than the percentage increase in the weight-based concentration of added water (based on the total weight of the egg-based material) included in the egg-based material (as a result of including added water in the egg-based substance), while still attaining a homogeneous blend of the components of the egg-based material and freeze/thaw stability in the various egg-based products of the present invention.

Flavoring agent(s) may optionally be included in the egg-based substance to allow optimization of flavor profiles in the cooked egg-based product and/or derivatives of the cooked egg-based product. Some non-exhaustive examples of suitable flavoring agent(s) include salt, pepper, spices, herbs, oleoresins, butter flavoring, and acidulants, such as citric acid, and any combination of any of these in any proportion. The collective concentration of any flavoring agent(s) included in the egg-based substance may generally range from about 0.01 weight percent to about 10 weight percent and, in some embodiments ranges from about 0.3 weight percent to about 1 weight percent, based on the total weight of the egg-based substance. Coloring agent(s) may also be optionally included in the egg-based substance to allow alteration of the color of the cooked egg-based product and/or derivatives of the cooked egg-based product. The collective concentration of any coloring agent(s) included in the egg-based substance may generally range from about 0.01 weight percent to about 3 weight percent, based on the total weight of the egg-based substance.

The egg-based substance may be prepared by first blending the egg component(s) of the egg-based substance into a homogenous liquid egg mixture using conventional high speed mixing equipment. Then, optional ingredient(s) of the egg-based substance, such as fat(s), stabilizing agent(s), liquid dairy material(s), flavoring agent(s), coloring agent(s), added water, and any combination of these in any proportion may be combined with and uniformly mixed with the homogenous liquid egg mixture. The egg-based substance may then optionally be supplemented by uniformly mixing the optional dairy product(s) with other component(s) of the egg-based substance to complete formation of the egg-based substance.

Some suitable exemplary, but non-exhaustive, formulations of the egg-based substance of the present invention that employ liquid whole egg as the natural liquid egg component, a combination of xanthan gum and modified, waxy maize cookup starch as optional stabilizing agents, and a combination of salt and citric acid as optional flavoring agents, but are free of any optional fat(s), free of any optional dairy material(s), and free of any optional coloring agent(s), may be prepared using the concentration ranges presented in Table I below to attain a total of 100 weight percent for the egg-based substance:

TABLE 1

| EGG-BASED SUBSTANCE | WEIGHT PERCENT* |
|---|---|
| Liquid Whole Egg | 87.12-99.47 |
| Citric Acid | 0.10-0.20 |
| Xanthan Gum | 0.12-0.20 |
| Salt | 0.10-0.45 |
| Modified, Waxy Maize Cookup Starch | 0.20-2.00 |

*Based on the total weight of the egg-based substance

As an alternative to separately providing, combining, and blending the various components of the egg-based substance, a commercially-available pre-mixed liquid egg product, commonly referred to as a "scrambled egg mixture" in the food preparation industry, may be purchased. Generally, any commercially-available pre-mixed liquid egg product or any thawed, commercially-available pre-mixed frozen egg product may be employed as the egg-based substance. Some exemplary commercially-available pre-mixed liquid egg products that may be employed as the egg-based substance and some exemplary commercially-available pre-mixed frozen egg products that may be thawed and employed as the egg-based substance may generally be obtained from any commercial egg-products company, such as Cutler Egg Products, Inc., of Abbeville, Ala. and Philadelphia, Pa., and Classic Egg Products, a division of Moark, LLC, of Neosho, Mo. Any commercially-obtained pre-mixed liquid egg product and any thawed, commercially-obtained pre-mixed frozen egg product may be supplemented, as desired, and uniformly mixed with any of the optional component(s) of the egg-based substance not already included at desired concentrations in the commercially-obtained pre-mixed liquid egg product or in the thawed, commercially-obtained pre-mixed frozen egg product.

One suitable exemplary, but non-exhaustive, formulation of the egg-based substance of the present invention obtainable as commercially-available pre-mixed liquid egg product that employs liquid whole egg as the natural liquid egg component, a combination of xanthan gum and modified, waxy maize cookup starch as optional stabilizing agents, and a combination of salt and citric acid as optional flavoring agents, but is free of any optional fat(s), free of any added water, free of any optional dairy material(s), and free of any optional coloring agent(s), has the indicated component concentrations presented in Table 2 below:

TABLE 2

| EGG-BASED SUBSTANCE | WEIGHT PERCENT* |
|---|---|
| Liquid Whole Egg | 98.30 |
| Citric Acid | 0.20 |
| Xanthan Gum | 0.15 |
| Salt | 0.35 |
| Modified, Waxy Maize Cookup Starch | 1.00 |

*Based on the total weight of the egg-based substance

Another exemplary embodiment of the egg-based substance of the present invention includes water or liquid egg whites in place of some of the liquid whole egg of the Table 2 formulation and has the formulation shown in Table 3 below:

TABLE 3

| EGG-BASED SUBSTANCE | WEIGHT PERCENT* |
|---|---|
| Liquid Whole Egg | 68.30 |
| Citric Acid | 0.20 |
| Xanthan Gum | 0.15 |
| Salt | 0.35 |
| Modified, Waxy Maize Cookup Starch | 1.00 |
| Added Water or Liquid Egg Whites | 30.00 |

*Based on the total weight of the egg-based substance

After the egg-based substance is prepared or commercially-obtained, as indicated above, the thickening agent and, optionally, pieces of supplemental food, are combined with the egg-based substance to form the egg-based material. When the optional pieces of supplemental food are combined with the thickening agent and the egg-based substance, the combination of the egg-based substance and the thickening agent, prior to addition of the optional pieces of supplemental food, is sometimes also referred to herein as an egg-based intermediate. Nonetheless, it has been surprisingly found the optional pieces of supplemental food may be blended into the egg-based substance either prior to, or along with, the thickening agent, while achieving beneficial results, as an alternative to blending the thickening agent into the egg-based substance prior to optional pieces of supplemental food.

The natural liquid egg component(s) of the egg-based substance contain free water; added water may also be included in the egg-based substance. The thickening agent is effective for absorbing water. Therefore, upon addition of the thickening agent to the egg-based substance, the thickening agent begins to absorb water originally present in the egg-based substance, such as free water of the natural liquid egg component(s) and/or added water. As water, such as free water of the natural liquid egg component(s), is absorbed by the thickening agent, the egg-based substance thickens and the viscosity of the egg-based substance increases.

When the optional pieces of supplemental food are included in the egg-based material, the thickening agent may first be mixed with the egg-based substance to form the egg-based intermediate with the thickened form and enhanced viscosity. The increased thickness and increased viscosity of the egg-based intermediate help retain the optionally-added pieces of supplemental food in suspension upon addition of the optional pieces of supplemental food to the egg-based intermediate and consequent formation of the egg-based material. Nonetheless, the optional pieces of supplemental food may be blended into the egg-based substance either prior to, or along with, the thickening agent, while still ultimately attaining uniform distribution of the optional pieces of supplemental food within the egg-based material. No matter whether added before, during, or after addition of the optional pieces of supplemental food, or even in the absence of any of the optional pieces of supplemental food, the thickening agent may generally be distributed within the egg-based substance and beneficially may be uniformly distributed within the egg-based substance to provide the egg-based material with a homogeneous composition.

Ultimately, the thickening agent and the concentration of the thickening agent in the egg-based material, will desirably be sufficient to maintain any optional pieces of supplemental food in suspension, and in at least substantially uniform suspension or even uniform suspension in various embodiments, within the egg-based material for a time period. The time period may vary depending on handling of the egg-based material prior to cooking the egg-based material to form the cooked egg-based product.

In many food production plants, the time period for maintaining suspension of supplemental food between preparation of the egg-based material and cooking of the egg-based material may range from just a few minutes up to an hour, an hour and a half, or even two hours. In other food production plants, the time period for maintaining suspension of supplemental food between preparation of the egg-based material and cooking of the egg-based material may range up to ten to twelve hours or even up to about twenty-four hours, to allow storage of the egg-based material prior to cooking of the egg-based material. Whatever food production plant operation scenario, the thickening agent and the concentration of the thickening agent in the egg-based material, will desirably be sufficient to maintain any optional pieces of supplemental food in suspension, and in at least substantially uniform suspension or even uniform suspension in various embodiments, within the egg-based material for the time period that matches each different food production plant operation scenario.

Some examples of suitable thickening agents include a cooked water-absorbent material, such as a cooked food product (a baked food product or a fried food product, for some examples). The cooked water-absorbent material, such as the cooked food product, may be in any form, such as chunks, pieces, particles, or crumbs (or any combination of these) of the cooked water-absorbent material that are amenable to at least substantially uniform distribution throughout the egg-based material. Crumbs of the cooked water-absorbent material are a convenient form of the cooked water-absorbent material that are readily amenable to measurement and uniform distribution within the egg-based material. In subsequent references to the cooked water-absorbent material, such as the cooked food product, the form of the cooked water-absorbent material is predominantly referred to as crumbs of the cooked water-absorbent material, though it is to be understood that chunks, pieces, and/or particles of the cooked water-absorbent material that are amenable to uniform distribution within the egg-based material may be substituted in place of some or all crumbs of the cooked water-absorbent material.

Examples of cooked food products that may serve as the thickening agent and yield suitable water-absorbent crumbs include bread (toasted or non-toasted), crackers, cookies, tortillas, breakfast cereal, cakes, crusts (such as pie crust), and any of these in any combination in any proportion. Some non-exhaustive exemplary bread sources of water-absorbent crumbs include ordinary sandwich bread, French bread, Italian bread, Irish soda bread, dinner rolls, biscuits, corn bread, and any of these in any combination in any proportion. The cooked food product that is the source of the water-absorbent crumbs may have been cooked by any conventional method, such as baking, frying, grilling, or microwaving.

The egg-based material, either with or without the optional pieces of supplemental food, may contain any concentration of the cooked food product (water-absorbent bread crumbs, for example) as the thickening agent. Also, the thickening agent may include any combination of any of the materials characterized herein as examples of suitable thickening agents in any proportion. In various embodiments, the egg-based material may typically include the cooked food product (such as the water-absorbent crumbs, including the water-absorbent bread crumbs) as the thickening agent at a concentration that ranges from about one weight percent to about twenty-five weight percent, based on the total weight of the egg-based material. In some embodiments, the egg-based material may typically include the cooked food product (such as the water-absorbent crumbs, including the water-absorbent bread crumbs) as the thickening agent at a concentration that ranges from about seven weight percent to about ten weight percent, based on the total weight of the egg-based material. Lesser concentrations of the thickening agent(s) may typically be employed in the egg-based material when the egg-based material employs none or smaller concentrations of the pieces of supplemental food product. On the other hand, higher concentrations of the thickening agent(s) may typically be employed in the egg-based material when the egg-based material includes higher concentrations of the pieces of supplemental food product.

A non-exhaustive list of water-absorbent bread crumbs that may be employed as the thickening agent include white bread crumbs (American or otherwise), corn bread crumbs, biscuit crumbs such as sweet biscuit crumbs, and oriental-style bread crumbs. Besides bread crumbs, some other non-exhaustive examples of suitable water-absorbent crumbs of cooked foods for use as the thickening agent include cake crumbs, corn bread crumbs, corn flake crumbs, cracker crumbs, matzo crumbs (sometimes referred to as matzo meal), and any of these in any combination in any proportion.

Oriental-style bread crumbs are employed as the thickening agent in some embodiments of the egg-based material. Oriental-style bread crumbs are generally bland in taste and therefore typically do not add any significant flavor to the liquid egg mixture. Of course, if desired for achieving a particular flavor profile, some Oriental-style bread crumbs with more significant flavor are available and may be employed as the thickening agent. Some alternative names for Oriental-style bread crumbs include, but are not limited to, Japanese-style bread crumbs, Panko-style bread crumbs, Japanese Panko crumbs and Panko. One example of the bread used to make the Panko bread crumbs that may be employed as the thickening agent is made from wheat flour, water, yeast, shortening, glucose and salt.

A variety of Panko bread crumb sources exist. For example, DYNASTY® Panko bread crumbs and WEL-PAC® Panko bread crumbs are each marketed by JFC International, Inc. of San Francisco, Calif. WOOMTREE™ Panko bread crumbs are produced by Woomtree Corporation of 163-4, Donae-Dong, Deokyang-Ku, Koyang-City, Kyunggi-Do, Korea. Additionally, DYNASTY® Panko bread crumbs and WOOMTREE™ Panko bread crumbs may be obtained from TransEthnic, Inc. of Elk Grove Village, Ill.

Besides cooked water-absorbent material, such as cooked food products (crumbs, chunks, pieces, and/or particles of bread (toasted or non-toasted), crackers, cookies, tortillas, breakfast cereal, cakes, crusts, etc.), some other examples of suitable thickening agents include dehydrated starchy plant materials, such as dehydrated potato flakes, dehydrated potato granules, and the like; and pre-gelatinized starches, starch-like plant extracts, and starch-like plant materials. Exemplary starches include cereal starch, tuber starch, any other plant starch (such as sago starch, for example), or any combination of any of these in any proportion. Some non-exhaustive examples of suitable cereal starches include corn starch, wheat starch, rice starch, waxy maize starch, sorghum starch, waxy sorghum starch, seed starch and any combination of any of these in any proportion. Some non-exhaustive examples of suitable tuber starches including potato starch, arrowroot starch, tapioca starch, and any combination of these in any proportion.

Some examples of suitable dehydrated potato flakes include those available under the BETTY CROCKER trade name designation from General Mills, Inc. of Golden Valley, Minn. The concentration of the dehydrated potato flakes in the egg-based material may generally range from about 0.1 weight percent to about fifteen weight percent, based on the total weight of the egg-based material, though concentrations of the dehydrated potato flakes in the egg-based material ranging from about 0.2 weight percent to about 8 weight percent, based on the total weight of the egg-based material, are employed in some embodiments.

The pre-gelatinized starches, pre-gelatinized starch-like plant extracts, and pre-gelatinized starch-like plant materials may optionally be physically-modified, chemically-modified, and/or enzymatically-modified, as desired, to enhance water-absorption properties and water-absorption rates of the pre-gelatinized starches, pre-gelatinized starch-like plant extracts, and pre-gelatinized starch-like plant materials. Beneficially, the pre-gelatinized starches, pre-gelatinized starch-like plant extracts, and pre-gelatinized starch-like plant materials that may be employed as the thickening agent may generally be in a form, such as a powdered form, that allows homogenous and at least substantially uniform dispersion of the pre-gelatinized starches, pre-gelatinized starch-like plant extracts, and pre-gelatinized starch-like plant materials throughout the egg-based material.

Some examples of suitable modified, pre-gelatinized starches include those available under the ULTRA SPERSE M and TEXTAID trade name designations from the Food Division sales office in Lincolnshire, Ill. of National Starch and Chemical Company. The concentration of the modified, pre-gelatinized starches in the egg-based material may generally range from about 0.1 weight percent to about fifteen weight percent, based on the total weight of the egg-based material, though concentrations of the modified, pre-gelatinized starch in the egg-based material ranging from about 0.2 weight percent to about 8 weight percent, based on the total weight of the egg-based material, are employed in some embodiments.

In one example demonstrating substitution of the ULTRA SPERSE M modified, pre-gelatinized starch for Panko bread crumbs as the thickening agent, the substitution proved satisfactory for various concentrations of the ULTRA SPERSE M modified, pre-gelatinized starch. The substitutions were based on a form of the egg-based material that included pieces of the supplemental food and about 8 weight percent Panko bread crumbs, based on the total weight of the egg-based material. The egg-based material included about 150 grams of the egg-based substance and about 30 grams of diced ham as the pieces of supplemental food. The temperature of the egg-based material and components thereof during this example were with the range of about 35° F. to about 75° F.

Use of either about 6 weight percent or about 3 weight percent of the ULTRA SPERSE M modified, pre-gelatinized starch in place of about 8 weight percent of the Panko bread crumbs as the thickening agent, based on the total weight of the egg-based material, resulted in the egg-based material having a thickness that was adequate to maintain suspension and distribution of the diced ham in the egg-based material for several hours. Use of about 1.5 weight percent of the ULTRA SPERSE M modified, pre-gelatinized starch in place of about 8 weight percent of the Panko bread crumbs as the thickening agent, based on the total weight of the egg-based material, resulted in the egg-based material having a thickness that was marginally acceptable for maintaining suspension and distribution of the diced ham in the egg-based material, though some stirring or mixing of the egg-based material would be required to extend the suspension and distribution of the diced ham in the egg-based material to several hours. Finally, Use of about 0.75 weight percent of the ULTRA SPERSE M modified, pre-gelatinized starch in place of about 8 weight percent of the Panko bread crumbs as the thickening agent, based on the total weight of the egg-based material, resulted in the egg-based material having a thickness that was insufficient for maintaining suspension and distribution of the diced ham in the egg-based material for even a few minutes.

The egg-based material, either with or without inclusion of the optional pieces of supplemental food, may generally contain any concentration of any of the materials characterized herein as examples of suitable thickening agents. Nonetheless, the concentration of the thickening agent(s) will generally be low enough so the egg-based material remains somewhat fluid in nature after incorporation of the thickening agent(s) and any optional pieces of supplemental food. Also, the thickening agent may generally include any combination of any of the materials characterized herein as examples of suitable thickening agents in any proportion. Lesser concentrations of the thickening agent(s) may typically be employed in the egg-based material when the egg-based material employs none or smaller concentrations of the pieces of supplemental food product. On the other hand, higher concentrations of the thickening agent(s) may typically be employed in the egg-based material when the egg-based material includes higher concentrations of the pieces of supplemental food product. Ultimately, the thickening agent(s) and the concentration of the thickening agent(s) in the egg-based material will desirably be sufficient to maintain any optional pieces of supplemental food in suspension, and in at least substantially uniform suspension or even uniform suspension in various embodiments, within the egg-based material for the time period that facilitates any desired food production plant operation scenario.

Different forms of the thickening agent(s) may perform in different ways within the egg-based material. For example, when uniformly distributed in a container that contains a quantity of water exceeding the absorbent capacity, the thickening agent that is in the form of the cooked water-absorbent material (such as bread crumbs) will typically absorb water so that two discrete phases remain in the container, namely a solid phase of the cooked water-absorbent material (such as bread crumbs) that is saturated with water and a separate liquid water phase that includes water not absorbed by the cooked water-absorbent material. On the other hand, when uniformly distributed in a container that contains a quantity of water exceeding the absorbent capacity of the thickening agent, the thickening agent that is in the form of the dehydrated plant material (dehydrated potato flakes or granules, for example) or the pre-gelatinized starch will typically be finely dispersed throughout the water in the container so that one discrete phase remains in the container.

Thus, some forms of the thickening agent(s) may result in two discrete phases existing in the egg-based material, namely a solid phase of the thickening agent(s) that is saturated with water and a separate liquid water phase that includes water not absorbed by the thickening agent(s), while other forms of the thickening agent(s) may result in one discrete phase existing in the egg-based material. Of course, inclusion of the optional pieces of supplemental food product may result in yet another phase, in addition to phases impacted by the form of the thickening agent(s). Furthermore, combinations of different forms of the thickening agent(s) may cause phases impacted by the form of the thickening agent(s) to interact with each other and further vary the phase(s) existent within the egg-based material.

The capacity of a particular material, such as a particular thickening agent, to absorb water may be characterized by a Water Absorption Test. According to this Water Absorption Test, a sample containing a known amount of the thickening agent is placed in water and allowed to absorb water during a test period. The average temperature of the water during the test period is determined. After the test period, the amount of water absorbed by the thickening agent sample is determined by determining the "wet" weight of the thickening agent. Besides employing different thickening agents, the temperature of the water and the duration of the test period may be variables that may be changes during different trials of the Water Absorption Test.

For a particular trial of the Water Absorption Test, a sample of the chosen thickening agent is weighed (the initial weight of the thickening agent—in grams) and the weighed sample of the thickening agent is thereafter placed in a container of water. The amount of water included in the container should be sufficient to ensure there will be excess free water remaining in the container after the thickening agent has absorbed as much water as the thickening agent is capable of absorbing or at the end of the test period, whichever is later. At the end of the test period, (1) the "wet" thickening agent containing absorbed water and, optionally, (2) the free water remaining in the container are deposited on a piece of Whatman #4 filter paper that is positioned in a three inch diameter Buchner funnel atop a vacuum flask. Whatman #4 filter paper may be obtained from Whatman, Inc. of Clifton, N.J. A partial vacuum of about 0.5 atmospheres is pulled on the vacuum flask for about five minutes or until no water flow into the vacuum flask is observed.

To calculate the weight of water absorbed per gram of the thickening agent, the weight of the thickening agent remaining on the Whatman #4 filter paper after vacuum cessation is determined (in grams); this is referred to herein as the "wet" weight of the thickening agent. The wet weight of the thickening agent is then subtracted from the initial weight of the thickening agent to determine the weight of water absorbed by the thickening agent (in grams) over the selected test period at the selected water temperature. The weight (in grams) of water absorbed by the thickening agent is then divided by the initial weight (in grams) of the thickening agent to yield the weight (in grams) of water absorbed per gram of the thickening agent, based on the initial condition of the thickening agent.

Samples of various materials characterized herein as examples of suitable thickening agents (i.e., dehydrated potato flakes, Panko bread crumbs, American bread crumbs, and pre-gel modified starch) and samples of one material characterized herein as an example of a suitable stabilizing agent, when evaluated according to the Water Absorption Test detailed above, exhibited the water absorption capabilities summarized in Table 4 during the indicated water absorption period using water at the indicated temperature:

helps to more uniformly disperse the thickening agent within the egg-based intermediate (or egg-based material) and produces a more consistent and uniformly thickened egg-based intermediate (or egg-based material).

The optional pieces of supplemental food may be mixed with the egg-based intermediate. Upon blending of the optional pieces of supplemental food into the egg-based intermediate, the egg-based intermediate is transformed into the egg-based material. The optional pieces of supplemental food may be homogeneously mixed with the egg-based intermediate. Inclusion of the thickening agent (such as water-absorbent crumbs, including, for example, water-absorbent bread crumbs) increases the thickness and viscosity of the egg-based material and thereby helps retain suspension and distribution of the optionally-added pieces of supplemental food throughout the egg-based material. Addition of the optional pieces of supplemental food into the egg-based intermediate may be delayed until after the egg-based intermediate has been allowed to thicken over a desired period of time to help ensure distribution of the optionally-added pieces of supplemental food is attained throughout the egg-based material.

As described above, the thickening agent may be incorporated in the egg-based substance to form the egg-based intermediate followed by incorporation of the optional pieces of supplemental food in the egg-based intermediate to form the egg-based material. Nonetheless, the optional pieces of supplemental food may permissibly be blended into the egg-based substance either prior to, or along with, the thickening

TABLE 4

| VARIABLE | | DEHYDRATED POTATO FLAKES | PANKO BREAD CRUMBS | AMERICAN BREAD CRUMBS | PURITY COOKUP MODIFIED CORN STARCH | ULTRA SPERSE PRE-GEL MODIFIED CORN STARCH | TEXTAID PRE-GEL MODIFIED CORN STARCH |
|---|---|---|---|---|---|---|---|
| Water Temperature | | 70° F. | 70° F. | 70° F. | 70° F. | 70° F. | 70° F. |
| Absorption | 5 | 2.64 | 5.06 | 4.02 | 0.9 | 16.7 | 7.03 |
| Period | 10 | 2.87 | 5.44 | 4.51 | 0.95 | 20.6 | 11.54 |
| (Minutes) | 20 | 3.07 | 5.62 | 4.60 | 1.00 | 21.6 | 11.6 |

Typically, one gram of the thickening agent(s) will be capable of absorbing at least about 1.5 grams of water, and in many embodiments of the thickening agent at least about 2.5 grams of water, during a five minute absorption period when the temperature of the water ranges from about 35° F. to about 70° F.

After being combined, the thickening agent and egg-based substance may be blended using a conventional mixer until the thickening agent is well distributed within the egg-based intermediate (or egg-based material if the optional pieces of supplemental food will not be combined with the egg-based intermediate). The egg-based intermediate (or egg-based material) may be allowed to rest for a period of time after combination of the thickening agent and the egg-based substance to allow water absorption by the thickening agent. Although any time period for allowing the thickening agent to absorb water is within the scope of the present invention, the time period for allowing the thickening agent to absorb water and thicken the egg-based intermediate (or egg-based material) is at least about twenty minutes in some embodiments and more beneficially ranges from about twenty minutes to about thirty minutes in various embodiments. Periodic stirring of the egg-based intermediate (or egg-based material) while allowing the thickening agent to absorb water and thicken the egg-based intermediate (or egg-based material)

agent in the course of forming the egg-based material that includes the egg-based substance and the thickening agent and optionally includes the pieces of supplemental food. When the optional pieces of supplemental food are blended into the egg-based substance prior to, or along with, the thickening agent in the course of forming the egg-based material, more vigorous mixing may be useful for suspending (distributing) the optional pieces of supplemental food in the egg-based substance until the thickening agent absorbs an amount of water that allows the optional pieces of supplemental food to remain distributed in the egg-based substance without any further mixing action.

The optional pieces of supplemental food may permissibly be included in the egg-based material to beneficially alter the taste, texture and/or appearance of the cooked egg-based product and derivatives of the cooked egg-based product. Examples of the supplemental food include cheese, cooked egg (yolk, white, or any combination of these), meat, fish, shellfish, vegetables, fruit, grain, and any of these in any combination in any proportion. The pieces of the supplemental food may generally have any desired size and geometric configuration for purposes of altering the taste, texture and/or appearance of the cooked egg-based product and derivatives of the cooked egg-based product. For example, the pieces of the supplemental food may be diced, pelleted, chopped, cubed, hashed, and/or minced in form.

As one example, the supplemental food may be a restricted melt cheese. A restricted melt cheese is a cheese with a melt temperature that is selectively controlled by including select ingredients in the cheese to achieve a melt profile for a specific or desired application. Use of restricted melt cheese as the supplemental food helps ensure that cheese present in the cooked egg-based product and derivatives of the cooked egg-based product will not have a flowable texture or appearance when the cooked egg-based product and derivatives of the cooked egg-based product are reheated after being frozen. Nonetheless, any cheese besides or in addition to restricted melt cheese may be employed as the supplemental food.

The egg-based material may permissibly include any desired concentration of the optional pieces of supplemental food, such as a concentration of the optional pieces of supplemental food ranging from about one weight percent to about ninety weight percent, based on the total weight of the egg-based material. In various embodiments, the concentration of the optional pieces of supplemental food in the egg-based material may range from about one weight percent to about thirty weight percent, based on the total weight of the egg-based material. Often, it has been found that concentrations of the optional pieces of supplemental food in the egg-based material ranging from about ten weight percent to about thirty weight percent, based on the total weight of the egg-based material, are adequate to beneficially alter the taste, texture and/or appearance of the cooked egg-based product and derivatives of the cooked egg-based product.

When the thickening agent(s) and the egg-based substance are included in the egg-based material and the optional pieces of supplemental food are not included in the egg-based material, the concentration of the egg-based substance in the egg-based material, based on the total weight of the egg-based material, may be determined by subtracting the collective concentrations of the thickening agent(s) in the egg-based material, based on the total weight of the egg-based material, from one hundred percent. Similarly, when the thickening agent, the optional pieces of supplemental food, and the egg-based substance are all included in the egg-based material, the concentration of the egg-based substance in the egg-based material, based on the total weight of the egg-based material, may be determined by subtracting the collective concentrations of the thickening agent(s) and the pieces of supplemental food in the egg-based material, based on the total weight of the egg-based material, from one hundred percent. In some embodiments, the concentration of the natural liquid egg component in the egg-based material that includes the pieces of supplemental food is greater than 70 weight percent, based on the total weight of the egg-based material, to enhance the "egg" taste of the cooked egg-based product and derivatives of the cooked egg-based product.

Like the egg-based substance, the egg-based material may also be free, or essentially free, of any added water. As used herein with regard to the egg-based material, the term "added water" means water added separately from any other component(s) of the egg-based material, water included as part of any reconstituted (i.e. made from a dry or dried form) component(s) of the egg-based substance, and water added separately from any other component(s) of the egg-based substance. Nonetheless, added water may permissibly be included in the egg-based material, if desired. When added water is included in the egg-based material, it has been surprisingly found that a corresponding increase in the amount of the thickening agent is not necessarily required for purposes of attaining a homogeneous blend of the components of the egg-based material or achieving freeze/thaw stability in the various egg-based products of the present invention. Rather, the percentage increase in the weight-based concentration of the thickening agent in the egg-based material is often less than the percentage increase in the weight-based concentration of added water included in the egg-based material, while still attaining a homogeneous blend of the components of the egg-based material and freeze/thaw stability in the various egg-based products of the present invention.

Some non-exhaustive examples of formulations of interest for the egg-based material that include the optional pieces of supplemental food are shown and described in Table 5 below:

TABLE 5

| Ingredient | Pepper Jack Formulation* | Pepper Jack Formulation* | Bacon & Cheese Formulation* | Bacon & Cheese Formulation* | Ham & Cheese Formulation* |
| --- | --- | --- | --- | --- | --- |
| Liquid Whole Eggs | 67.826 | 47.069 | 68.454 | 47.624 | 65.917 |
| Xanthan Gum | 0.094 | 0.126 | 0.095 | 0.126 | 0.091 |
| Salt | 0.3 | 0.3 | 0.303 | 0.3 | 0.292 |
| Starch[A] | 0.75 | 0.875 | 0.758 | 0.875 | 0.73 |
| Japanese Bread Crumbs | 6 | 7.5 | 6.06 | 7.5 | 5.84 |
| Diced Pepper Jack Cheese | 24.9 | 24 | — | — | — |
| Diced Ham | — | — | — | — | 10 |
| Diced Cheddar Cheese | — | — | 17 | 16 | 17 |
| Crumbled Bacon | — | — | 7.2 | 6.445 | — |
| Citric Acid | 0.13 | 0.13 | 0.13 | 0.13 | 0.013 |
| Added Water | — | 20 | — | 21 | — |
| Total Formulation Weight % | 100 | 100 | 100 | 100 | 100 |

*In Weight Percent. Based on the Total Weight of the Egg-based Material
[A]Modified, waxy maize, cookup starch The egg-based material that may either include or exclude the optional pieces of supplemental food is heated to a select temperature over a period of time that ensures the natural liquid egg component(s) substantially, and preferably fully, coagulate (solidify) and consequently transforms the egg-based material into the cooked egg-based product. To accomplish this heating, the egg-based material may beneficially be placed in a water-impermeable cooking container, such as a plastic bag or a chub pack, prior to heating. During this placement, it will be seen that the egg-based material typically has a fluid, flowable consistency. The water-impermeable cooking container containing the egg-based material may be placed onto a rack and submerged into boiling water, placed in a microwave oven for microwave-induced heating, or otherwise heated. When the chub pack is employed, the chub pack, either separately or in combination with the rack, causes the solidifying egg-based material to be molded as the cooked egg-based product into a desired configuration with desired dimensions (such as length, width, and thickness).

The egg-based material may generally be processed to form the cooked egg-based product by heating the egg-based material to a temperature ranging from about 160° F. to about 212° F. for a heating period ranging from about one half hour to about one and one half hours. As a suitable example, the egg-based material may typically be processed to form the cooked egg-based product by heating the egg-based material to a temperature ranging from about 190° F. to about 200° F. for a heating period of about one hour. Persons skilled in the art will recognize that the cooking time and temperature are dependent on both the amount and the configuration of the egg-based material being cooked and will be able to modify the cooking time and/or cooking temperature accordingly.

Formation of the egg-based product with larger thicknesses will typically require a higher heated temperature and/or a longer cooking time. Persons skilled in the art will also recognize that configurations having a greater thickness will require longer cooking times and/or higher cooking temperature(s) to adequately coagulate (solidify) the natural liquid egg component(s) and transform the egg-based material into the cooked egg-based product and will be able to modify the cooking time and/or cooking temperature accordingly. Additionally, the egg-based material may be cooked under superatmospheric pressure, and consequently at a higher temperature, to decrease the cooking time required to adequately coagulate (solidify) the natural liquid egg component(s) and transform the egg-based material into the cooked egg-based product.

After formation of the cooked egg-based product, the warm, cooked egg-based product may be cooled to a temperature ranging from about 35° F. to about 45° F. The cooked egg-based product may be cooled by any suitable technique that may employ cold or cool water, ice, chilled air, liquid nitrogen, carbon dioxide, or any of these in any combination. One skilled in the art will recognize that a waterproof barrier may be desirable when the warm, cooked egg-based product is cooled by immersion in water and/or ice to prevent free moisture from permeating into the cooked egg-based product. Such permeation of free moisture into the cooked egg-based product may adversely affect the organoleptic properties of the cooked egg-based product when reheating the cooked egg-based product from a frozen state. In addition to merely being cooled to refrigeration temperatures upon formation, the warm cooked egg-based product may permissible be frozen immediately after removal of the warm, cooked egg-based product from the heating source, and then later thawed before further processing or use.

After being cooled, the cooked egg-based product may be removed from the water-impermeable cooking container and cut into any desired geometric configuration. Some nonexhaustive examples of desirable configurations are geometric configurations that are easily gripped by a person=s hand and preferably mimic geometric configurations of hand-held foods already commercially available, such as, but not limited to, chicken nuggets, french toast sticks, and hash brown potato patties and wedges. In some embodiments, the cut forms of the cooked egg-based product have the geometric configuration of a nugget with a weight that ranges from about five grams to about forty grams and may, in other embodiments, range from about ten grams to about eighteen grams to better mimic commercially available hand-held foods, such as chicken nuggets.

As an alternative to cutting the cooked egg-based product into convenient hand-held configurations, the cooked egg-based product may also be cut into diced pieces, such as diced pieces with length, width, and height dimensions as small as about one fourth of an inch. The diced pieces of the cooked egg-based product may be combined with a fluid binder, such as a liquid medium consisting of eggs and a starch, to adhere the diced pieces together in the form of a patty or a in the form of a spheroidal product similar in shape to a meatball.

As another option, the cooked egg-based product (or the cut pieces of the cooked egg-based product) may be batter-coated and/or breaded to form a coated egg-based product prior to being frozen or further processed. The batter-coating may, by way of non-exhaustive example, be based upon a blend of a dry batter mix and water with a composition ranging from about ten to about fifty weight percent batter mix and from about ninety to about fifty weight percent water, based upon the total weight of the batter coating. In some embodiments, the batter-coating is based upon a blend of about forty weight percent batter mix and about sixty weight percent water, based upon the total weight of the batter coating.

Optionally, the cooked egg-based product (or the cut pieces of the cooked egg-based product) may be pre-dusted in conventional fashion prior to application of the batter coating to the cooked egg-based product (or the cut pieces of the cooked egg-based product). The pre-dust medium is typically formulated to increase batter adhesion to the egg-based product upon multiple passages through the battering process and any subsequent breading process. As another alternative, the cooked egg-based product may be coated with the batter and breading after first passing the cooked egg-based product through a deep fat fryer at a temperature of about 340° F. for about two minutes to form a pre-fried egg-based composition and help ensure the batter adheres to the pre-fried egg-based composition.

After application of the batter coating to the cooked egg-based product (or the cut pieces of the cooked egg-based product), the battered egg-based product may optionally be passed through a breading machine. In the breading machine, the battered egg-based product may be coated with bread crumbs, such as American bread crumbs. Thereafter, the battered and breaded egg-based product (i.e. the coated egg-based product) may again be battered and coated with breading one or more additional times.

The coated egg-based product will typically be heated to ensure the breading adequately adheres to the batter present on the coated egg-based product. As some non-exhaustive examples, the coated egg-based product may be heated by deep fat frying to form the fried egg-based product, may be baked to form a baked egg-based product, or may be subjected to microwave energy in a microwave oven to form a microwaved egg-based product. After heating, the fried egg-based product, the baked egg-based product, and the microwaved egg-based product may have one or more additional coatings applied to better adhere the breading to the fried egg-based product, the baked egg-based product, and the microwaved egg-based product. Thereafter, the breaded forms of the fried egg-based product, the baked egg-based product, and the microwaved egg-based product may be cooled, packaged, and individually quick frozen. As yet another alternative, the coated egg-based product may be frozen without subsequent heating to allow final frying, baking, or microwaving of the coated egg-based product by the end user, such as the consumer.

The fried egg-based product, the baked egg-based product, the microwaved egg-based product, or, if not cooked after breading and battering, the coated egg-based product may be stored in a frozen state until shortly before consumption by the end user. Prior to being consumed, the fried egg-based product, the baked egg-based product, the microwaved egg-based product, or simply the coated egg-based product may be heated and thawed using any desired heating technique. Typically, prior to being consumed, the fried egg-based product, the baked egg-based product, the microwaved egg-based product, or the coated egg-based product will be thawed and heated using a conventional oven, a convection oven, a toaster oven, a microwave oven, or a deep fat fryer. The fried egg-based product, the baked egg-based product, and the microwaved egg-based product are preferably heated to an internal temperature ranging from about 145° F. to about 165° F. in preparation for consumption. On the other hand, the coated egg-based product may additionally be heated for a heating period and at a temperature sufficient to sufficiently cook the breading and batter coating while additionally heating the coated egg-based product to an internal temperature ranging from about 145° F. to about 165° F. in preparation for consumption.

Inclusion of the thickening agent (such as the water-absorbent crumbs, including the water-absorbent bread crumbs) increases the thickness and viscosity of the egg-based material and thereby helps retain suspension and distribution of the optionally-added pieces of supplemental food throughout the egg-based material. After the egg-based material is heated and thereby cooked to form the egg-based product of the present invention, the existence of the thickening agent that continues to hold free water and any optional added water helps prevent separation of water upon freeze/thaw (reheating) cycling of the egg-based product and derivatives of the egg-based product, such as the fried egg-based product, the baked egg-based product, the microwaved egg-based product, or simply the coated egg-based product.

Consequently, due to incorporation of the thickening agent (such as the water-absorbent crumbs, including the water-absorbent bread crumbs) in the egg-based material in accordance with the present invention, the egg-based product and derivatives of the egg-based product, such as the fried egg-based product, the baked egg-based product, the microwaved egg-based product, and the coated egg-based product exhibit freeze/thaw stability upon freeze/thaw (reheating) cycling of the egg-based product and derivatives of the egg-based product. This freeze/thaw stability of the egg-based product and derivatives of the egg-based product is visually discernable by simple observation.

Specifically, if a frozen form of the egg-based product or any derivative of the egg-based product is thawed, such as by heating, and little, if any, free water originating from the thawed egg-based product or from the thawed derivative of the egg-based product is visually observed proximate the thawed egg-based product or proximate the thawed derivative of the egg-based product, then the egg-based product or any derivative of the egg-based product is said to exhibit freeze/thaw stability. Otherwise stated in numeric terms, when a frozen form of the egg-based product or any derivative of the egg-based product weighing about 50 grams is thawed, the egg-based product or the derivative of the egg-based product is said to exhibit freeze/thaw stability when about two grams or less of free water originating from the thawed egg-based product or from the thawed derivative of the egg-based product visually appears proximate the thawed egg-based product or proximate the thawed derivative of the egg-based product.

In various embodiments, when a frozen form of the egg-based product or any derivative of the egg-based product weighing about 50 grams is thawed about one gram or less of free water originating from the thawed egg-based product or from the thawed derivative of the egg-based product visually appears proximate the thawed egg-based product or proximate the thawed derivative of the egg-based product. In some of these embodiments, when a frozen form of the egg-based product or any derivative of the egg-based product weighing about 50 grams is thawed, no free water originating from the thawed egg-based product or from the thawed derivative of the egg-based product is visually observed proximate the thawed egg-based product or proximate the thawed derivative of the egg-based product.

Besides being visually appealing to consumers, the presence of only little, if any, free water upon thawing of a frozen form of the egg-based product or a frozen form of any derivative of the egg-based product demonstrates the thawed egg-based product and the thawed derivatives of the egg-based product will exhibit good organoleptic properties. For example, retention of water within the thawed egg-based product and the thawed derivatives of the egg-based product will tend to prevent the thawed egg-based product and the thawed derivatives of the egg-based product from becoming tough, chewy, and unpalatable to human beings. Consequently, retention of water within the thawed egg-based product and thawed derivatives of the egg-based product that is supported by incorporation of the thickening agent within the egg-based material allows the thawed egg-based product and thawed derivatives of the egg-based product to exhibit the same or very similar organoleptic properties exhibited soon after original preparation (without freezing), or shortly thereafter, by the egg-based product and derivatives of the egg-based product.

Although the present invention has been described with reference to preferred embodiments, workers skilled in the art will recognize that changes may be made in form and detail without departing from the spirit and scope; of the invention.

The invention claimed is:

1. An egg-based material, the egg-based material comprising:
    an egg-based substance comprising between about 65 weight percent and 99.5 weight percent of the egg-based material;
    a water-absorbent thickener comprising between about 0.2 weight percent and 8 weight percent of the egg-based material, the water-absorbent thickener being distributed throughout the egg-based material; and
    pieces of supplemental food distributed throughout the egg-based material, the water-absorbent thickener effective to maintain distribution of the pieces of supplemental food throughout the egg-based material, and wherein the egg-based material originates substantially no free water upon freezing and then thawing and exhibits the same or similar organoleptic characteristics after freezing and thawing as the egg-based material had prior to freezing and thawing.

2. The egg-based material of claim 1 wherein the supplemental food is selected from the group consisting of cheese, cooked egg, meat, fish, shellfish, vegetables, fruit, grain, and any of these in any combination.

3. The egg-based material of claim 1 wherein the egg-based substance includes a natural liquid egg component selected from the group consisting of natural liquid whole egg, natural liquid egg yolk, natural liquid egg white, and any combination of any of these.

4. The egg-based material of claim 1 wherein the water-absorbent thickener comprises chunks, pieces, particles, or crumbs of a cooked food product.

5. The egg-based material of claim 4 wherein the cooked food product comprises bread, cracker, cookie, tortilla, breakfast cereal, cake, or crust, or any of these in any combination.

6. The egg-based material of claim 4 wherein the concentration of the cooked food product in the egg-based material includes up to as much as about 25 weight percent, based on the total weight of the egg-based material.

7. The egg-based material of claim 1 wherein heating of the egg-based material sufficient to substantially coagulate the egg-based substance is effective to transform the egg-based material into an egg-based product that exhibits freeze/thaw stability.

8. The egg-based material of claim 1 wherein the egg-based material has a fluid, flowable consistency.

9. The egg-based material of claim 1 wherein the water-absorbent thickener is capable of absorbing at least about 1.5 grams of water during a five minute absorption period when the temperature of the water ranges from about 35.degree. F. to about 70.degree. F.

10. The egg-based material of claim 1 wherein the egg-based material further comprises a liquid dairy material.

11. The egg-based material of claim 10 wherein the liquid dairy material comprises whole milk, reduced-fat milk, skim milk, dairy cream, buttermilk, sour cream, or yogurt, or any of these in any combination.

12. A cooked food product, the cooked food product comprising a form of the egg-based material of claim 1 wherein the egg-based substance includes a the natural liquid egg component that is coagulated.

13. The cooked food product of claim 12 wherein the cooked food product has an outer surface, the cooked food product further comprising batter or breading affixed to the outer surface.

14. A fried food product, the fried food product comprising the cooked food product of claim 13 with a fried form of the batter or breading.

15. An egg-based material comprising:
an egg-based substance comprising between about 65 weight percent and 99.5 weight percent of the egg-based material;
a cooked water-absorbent material distributed within the egg-based substance, the cooked water-absorbent material comprising about 0.2 weight percent and 8 weight percent of the egg-based material, and wherein the egg-based material originates substantially no free water upon freezing and then thawing and exhibits substantially similar chewability characteristics after freezing and thawing as the egg-base material had prior to freezing and thawing.

16. The egg-based material of claim 15 wherein:
the egg-based substance includes a natural liquid egg component that comprises free water; and
the cooked water-absorbent material comprises bread crumbs, free water of the natural liquid egg component absorbed in the breadcrumbs.

17. The egg-based material of claim 15 wherein the cooked water-absorbent material comprises chunks, pieces, particles, or crumbs of a cooked food product.

18. The egg-based material of claim 17 wherein the cooked food product comprises bread, cracker, cookie, tortilla, breakfast cereal, cake, crust, or any of these in any combination.

19. The egg-based material of claim 15 wherein one gram of the cooked water-absorbent material is capable of absorbing at least about 1.5 grams of water during a five minute absorption period when the temperature of the water ranges from about 35.degree. F. to about 70.degree. F.

20. The egg-based material of claim 15 wherein the egg-based substance further comprises a stabilizing agent, the concentration of the stabilizing agent in the egg-based material having up to about 5 weight percent, based on the total weight of the egg-based material, and the concentration of the cooked water-absorbent material in the egg-based material having up to about 25 weight percent, based on the total weight of the egg-based material.

21. A cooked food product, the cooked food product comprising a form of the egg-based material of claim 15 wherein egg-based substance includes a the natural liquid egg component that is coagulated.

22. The cooked food product of claim 21 wherein the cooked food product has an outer surface, the cooked food product further comprising batter or breading affixed to the outer surface.

23. A fried food product, the fried food product comprising the cooked food product of claim 22 with a fried form of the batter or breading.

24. The egg-based material of claim 15 the egg-based material further comprising pieces of supplemental food.

25. The egg-based material of claim 24 wherein the supplemental food comprises cheese, cooked egg, meat, fish, shellfish, vegetables, fruit, or grain, or any of these in any combination.

26. A cooked food product, the cooked food product comprising a form of the egg-based material of claim 24 wherein the egg-based substance includes a the natural liquid egg component that is coagulated.

27. An egg-based material, the egg-based material comprising:
an egg-based substance, comprising between about 65 weight percent and 99.5 weight percent of the egg-based material;
a water-absorbent material comprising between about 0.2 and 8.0 weight percent of the egg-based material, one gram of the water-absorbent material effective to absorb at least about 1.5 grams of water during a five minute absorption period when the temperature of the water ranges from about 35.degree. F. to about 70.degree. F.; and
a liquid dairy material;
wherein the egg-based material originates substantially no free water upon freezing and then thawing and exhibits substantially similar chewability characteristics after freezing and thawing as the egg-based material had prior to freezing and thawing.

28. The egg-based material of claim 27 wherein the liquid dairy material comprises whole milk, reduced-fat milk, nonfat milk, dairy cream, buttermilk, sour cream, or yogurt, or any of these in any combination.

29. A cooked food product, the cooked food product comprising a form of the egg-based material of claim 27 wherein the natural liquid egg component is coagulated.

30. The cooked food product of claim 29 wherein the cooked food product has an outer surface, the cooked food product further comprising batter or breading affixed to the outer surface.

31. A fried food product, the fried food product comprising the cooked food product of claim 30 with a fried form of the batter or breading.

32. The egg-based material of claim 27 the egg-based material further comprising pieces of supplemental food.

33. The egg-based material of claim 32 wherein the supplemental food comprises cheese, cooked egg, meat, fish, shellfish, vegetables, fruit, or grain, or any of these in any combination.

34. A cooked food product, the cooked food product comprising a form of the egg-based material of claim 32 wherein the egg-based substance includes a natural liquid egg component that is coagulated.

35. An egg-based material, the egg-based material comprising:
an egg-based substance comprising between about 65 weight percent and 99.5 weight percent of the egg-based material, the egg-based substance comprising a natural liquid egg component;
a water-absorbent material comprising between about 0.2 and 8.0 weight percent of the egg-based material, one gram of the water-absorbent material effective to absorb at least about 1.5 grams of water during a five minute absorption period when the temperature of the water ranges from about 35.degree. F. to about 70.degree. F.; and
added water wherein the egg-based material originates substantially no free water upon freezing and then thawing and exhibits substantially similar chewability characteristics after freezing and thawing as the egg-based material had prior to freezing and thawing.

36. The egg-based material of claim 35 wherein the egg-based material has a fluid, flowable consistency.

37. A cooked food product, the cooked food product comprising a form of the egg-based material of claim 35 wherein the natural liquid egg component is coagulated.

38. The cooked food product of claim 37 wherein the cooked food product exhibits freeze/thaw stability.

39. The cooked food product of claim 37 wherein the cooked food product has an outer surface, the cooked food product further comprising batter or breading affixed to the outer surface.

40. A fried food product, the fried food product comprising the cooked food product of claim 39 with a fried form of the batter or breading.

41. The egg-based material of claim 35 the egg-based material further comprising pieces of supplemental food.

42. A cooked food product, the cooked food product comprising a form of the egg-based material of claim 41 wherein the natural liquid egg component is coagulated.

43. An egg-based material, the egg-based material comprising:
an egg-based substance comprising between about 65 weight percent and 99.5 weight percent of the egg-based material, the egg-based substance comprising a natural liquid egg component;
a stabilizing agent;
a water-absorbent material comprising between about 0.2 and 8.0 weight percent of the egg-based material; and
added water wherein the egg-based material originates substantially no free water upon freezing and then thawing and exhibits substantially similar chewability characteristics after freezing and thawing as the egg-based material had prior to freezing and thawing.

44. The egg-based material of claim 43 wherein the stabilizing agent comprises starch or gum.

45. The egg-based material of claim 43 wherein one gram of the water-absorbent material is effective to absorb at least about 1.5 grams of water during a five minute absorption period when the temperature of the water ranges from about 35.degree. F. to about 70.degree. F.

46. A cooked food product, the cooked food product comprising a form of the egg-based material of claim 43 wherein the natural liquid egg component is coagulated.

47. The cooked food product of claim 46 wherein the cooked food product has an outer surface, the cooked food product further comprising batter or breading affixed to the outer surface.

48. A fried food product, the fried food product comprising the cooked food product of claim 47 with a fried form of the batter or breading.

49. The egg-based material of claim 43, the egg-based material further comprising pieces of supplemental food.

50. A cooked food product, the cooked food product comprising a form of the egg-based material of claim 49 wherein the natural liquid egg component is coagulated.

* * * * *